(12) United States Patent
Exline et al.

(10) Patent No.: US 8,465,843 B2
(45) Date of Patent: *Jun. 18, 2013

(54) CRACK RESISTANT COATING AND METHOD OF APPLYING CRACK RESISTANT COATING

(75) Inventors: Marvin Keller Exline, Terre Haute, IN (US); Jon Brett Wingo, Broken Arrow, OK (US); James Joseph Cunningham, Greensburg, PA (US); James J. Barnat, Tulsa, OK (US)

(73) Assignee: Arr-Maz Products, L.P., Mulberry, FL (US)

(*) Notice: Subject to any disclaimer, the term of this patent is extended or adjusted under 35 U.S.C. 154(b) by 385 days.

This patent is subject to a terminal disclaimer.

(21) Appl. No.: 13/031,971

(22) Filed: Feb. 22, 2011

(65) Prior Publication Data

US 2011/0142538 A1 Jun. 16, 2011

Related U.S. Application Data

(62) Division of application No. 12/540,847, filed on Aug. 13, 2009.

(51) Int. Cl.
*B32B 11/02* (2006.01)
*E01C 7/26* (2006.01)
*E01C 7/30* (2006.01)

(52) U.S. Cl.
USPC ............... 428/489; 428/306.6; 428/317.1; 428/317.3; 428/332; 404/31

(58) Field of Classification Search
None
See application file for complete search history.

(56) References Cited

U.S. PATENT DOCUMENTS

| 4,145,322 A | 3/1979 | Maldonado et al. | |
| 4,154,710 A | 5/1979 | Maldonado et al. | |
| 4,330,449 A | 5/1982 | Maldonado et al. | |
| 5,024,554 A * | 6/1991 | Benneyworth et al. | 404/74 |
| 5,069,578 A | 12/1991 | Bense et al. | |
| 7,802,941 B2 * | 9/2010 | Wingo et al. | 404/82 |
| 2009/0097918 A1 * | 4/2009 | Larson et al. | 404/75 |

FOREIGN PATENT DOCUMENTS

| EP | 0814198 | 12/1997 |
| EP | 1767581 | 3/2007 |
| JP | 08-109603 | 4/1996 |
| JP | 2004036227 | 2/2004 |
| KR | 10-0603916 | 7/2006 |
| KR | 10-0788050 | 12/2007 |

OTHER PUBLICATIONS

Korean Intellectual Property Office, The International Search Report and Written Opinion of the International Searching Authority, Form PCT/ISA/220, Dec. 27, 2010, pp. 1-8, International Searching Authority, Republic of Korea.

(Continued)

*Primary Examiner* — David Sample
(74) *Attorney, Agent, or Firm* — Head, Johnson & Kachigian, P.C.

(57) ABSTRACT

The present invention relates to a method for applying a crack resistant coating on a surface, where the crack resistant coating increases resistance to high vertical and horizontal movements and high shear stresses on the surface. The method comprises the steps of applying a binding material to the surface and applying an aggregate mixture within 15 seconds of applying the binding material to the surface, where the aggregate mixture comprises aggregate particles and an asphalt solution and where the aggregate mixture has a plurality of air voids, and where the binding material fills at least 15% of the air voids in the aggregate mixture (AVFA).

12 Claims, 3 Drawing Sheets

OTHER PUBLICATIONS

Mellot, James M, Office Communication from The U.S. Patent and Trademark Office concerning U.S. Appl. No. 12/540,847, Jun. 20, 2011, pp. 1-13, U.S. States Department of Commerce, U.S. Patent and Trademark Office, Alexandria, Virginia, USA.

Wilkinson, Cassandra L., Amendment and Response to Office Communication from the U.S. Patent and Trademark Office for U.S. Appl. No. 12/540,847, Crack Resistant Coating and Method of Applying Crack Resistant Coating; Jul. 27, 2011, pp. 1-13, Head, Johnson & Kachigian, P.C., Tulsa, Oklahoma, USA.

* cited by examiner

CRACK RESISTANT COATING AND METHOD OF APPLYING CRACK RESISTANT COATING

CROSS REFERENCE TO RELATED APPLICATION

The present application is a divisional of application Ser. No. 12/540,847 filed Aug. 13, 2009 titled "Crack Resistant Coating and Method of Applying Crack Resistant Coating." The parent application is incorporated by reference herein as if reproduced in full below.

BACKGROUND OF THE INVENTION

1. Field of the Invention

The present invention relates to a surface coating applied to a surface, and more particularly, not by way of limitation, to a crack resistant coating on a surface and a method for applying the crack resistant coating on the surface to increase resistance to high vertical and horizontal movements and high shear stresses caused by cracks or irregularities in the surface and high shear stresses caused by traffic. In addition, the crack resistant coating of the present invention provides increased resistance to reflective cracking.

2. Description of the Related Art

It is desirable to place a new surface or a new pavement over pavement used to construct roads, parking lots, airport runways, airport taxiways, and the like and not have existing cracks reappear in the new pavement for long periods of time. Cracks in the pavement are a form of distress, which can lead to premature failure of the new pavement. The cracks allow moisture (i.e. water) to enter into the existing (i.e. underlying) pavement and create structural support issues. Additionally, the cracks can also create ride quality issues, which may require grinding to smoothing, time intensive crack filing operations to seal the pavement, or significant costs to apply one or more additional pavement layers to address the problem.

It is common for pavements to crack during their expected service life. Reflective cracks occur when a pavement layer is placed over a cracked pavement. The existing cracks transmit into the new pavement after a period of time. These cracks in the new pavement can be created by several mechanisms, one of which is thermal stress. The pavement cracks form when asphalt in the pavement hardens from aging to the point that it cannot relieve the stress as the pavement tries to bend from the differences in temperature from the top of the pavement to the bottom of the pavement. Thermal cracks normally manifest as cracks that run transverse to the direction of travel.

Heavy truck loading also causes cracks in the pavement. Radial tires of trucks used in heavy truck loading impart a tensile force at the outer edge of the radial tires on the surface of the pavement. This tensile force can create a longitudinal crack where the outer edge of the radial tires contacts the pavement. Construction issues may also contribute to longitudinal cracking. Segregation of a pavement mixture may occur from mechanical issues with the paving equipment. The segregation occurs during placement of the material and runs in a direction of the paving equipment.

Generally, the lesser the thickness of the new pavement, the lesser the time before the crack becomes visible in the new pavement. To those skilled in the art, a general rule is that every inch of new pavement provides about one year delay in reflective cracking (i.e. a crack in the pavement propagates a crack in the new pavement wherein the crack in the pavement will grow about one inch per year). The generally accepted practice to combat the "one (1) inch per year" crack propagation is to place 6" to 10" of paving mixture on existing cracked concrete or pavement to keep cracks from appearing for several years. This is an inefficient solution to the problem because of the increased cost and time to lay the paving mixture in amounts that large.

Interlayer type materials are a method of addressing reflective cracking. There are different method and materials used for constructing an interlayer. One method for constructing an interlayer utilizes applying a heavy application of a liquid binding material followed by an application of an aggregate. This technique is limited by the amount of liquid binding material that may be applied without creating flow of the liquid binding material to areas other than intended. Larger aggregate sizes are typically used so as to permit the heavy application of liquid binding material. If opened to traffic before a suitable paving mixture is placed over the interlayer, the interlayer may create high traffic noise and hazards: from loose aggregate. This interlayer is therefore covered with a suitable surface material as soon as possible.

Another form of interlayer may involve the placement of a fabric or grid material in a layer of a liquid binding material. The grids or fabrics are challenging to place smoothly, especially when paving is not in a straight line. Grids and fabrics are not intended as a surface for normal traffic. Therefore, grids and fabrics. must be covered with a suitable surface material before normal traffic can be resumed. In addition, grids and fabrics are extremely expensive and are relatively slow to construct.

An alternate form of interlayer may be in the form of an asphalt-aggregate mixture. This technique utilizes high asphalt content in the paving mixture, usually of a highly elastic nature. High asphalt content pavement poses the problem of the liquid binding material flowing from the mixture during manufacture or placement. High asphalt content interlayer mixtures may be sensitive to deformation from traffic and may provide low texture or reduced safety for the motoring public. Therefore, it is covered with a suitable surface material as soon as possible. An example of this type of interlayer is U.S. Pat. No. 6,830,408 to Blankenship, et. al issued on Dec. 14, 2004 which is hereby incorporated by reference.

Another type of paving process is shown in U.S. Pat. No. 5,069,578, issued to Bense et al. on Dec. 3, 1991. The Bense et al. patent provides a relatively thin pavement having higher asphalt content than was known by those of ordinary skill in the art. at the time. The method comprises of spreading a layer of binding material, spreading at least one layer of aggregate material on the binding material, where the aggregates consist of loose chips covered with a mixture of bitumen and pulverulent material, performed in succession within 5 seconds. This material has been in industry for almost 20 years and is routinely placed at ≦3.81 cm. One problem with the pavement disclosed in the Bense et al. patent is that the pavement readily cracks in less than about one (1) year, more specifically, the pavement typically demonstrates substantial reflective cracking in less than 6 months.

An aggregate material has a varying percentage of air voids when applied in paving applications. When the aggregate material is used in paving applications with asphalt material, the asphalt material fills a percentage of the air voids present in the aggregate material. In the past, it was believed that about 3% to 5% of the air voids of the aggregate material need to remain unfilled to maintain the necessary structure of the pavement and resist rutting.

Accordingly, there remains a need for a method to efficiently create a surface coating having crack resistant properties wherein the crack resistant properties are enhanced to extend the life of the surface coating prior to cracking of the surface while still maintaining stability of the surface coating to allow the safe travel of traffic.

SUMMARY OF THE INVENTION

In general, in a first aspect, the present invention relates to a method for applying a crack resistant coating on a surface, where the crack resistant coating increases resistance to high vertical and horizontal movements and high shear stresses on the surface. The method comprises the steps of applying a binding material to the surface and applying an aggregate mixture within 15 seconds of applying the binding material to the surface, where the aggregate mixture comprises aggregate particles and an asphalt solution and where the aggregate mixture has a plurality of air voids, and where the binding material fills at least 15% of the air voids in the aggregate mixture (AVFA). The binding material may fill at least 18% of the air voids in the aggregate mixture (AVFA), and the aggregate mixture may be applied within 10 seconds or within 5 seconds of applying the binding material to the surface.

The binding material and the aggregate mixture may comprise the crack resistant coating and the crack resistant coating may contains a total binding material in an amount greater than about 1.00 $L/(m^2$-cm), 1.30 $L/(m^2$-cm), or 1.51 $L/(m^2$-cm) where the total binding material is a sum of the net binding material and the asphalt solution. The method of applying the crack resistant coating may further comprise allowing the binding material to fill some of the air voids in the aggregate mixture to form a substantially voidless layer with a height of at least 0.38 cm or at least 0.46 cm.

In a second aspect, the present invention relates to a method for applying a crack resistant coating on a surface, where the crack resistant coating increases resistance to high vertical and horizontal movements and high shear stresses on the surface, where the crack resistant coating has binding material layers, aggregate mixture layers, and a wear surface for traffic. The method comprises the steps of applying a first binding material layer of the crack resistant coating on the surface to provide a substantially impermeable moisture barrier to the surface; applying a first aggregate mixture layer of the crack resistant coating on the first binding material layer, the first aggregate mixture layer providing support and structure to the crack resistant coating to resist rutting; applying a second binding material layer of the crack resistant coating on the first aggregate mixture layer, the second binding material layer providing a second substantially impermeable moisture barrier to the surface; and applying a second, aggregate mixture layer of the crack resistant coating on the second binding material layer, the second aggregate mixture layer providing the wear surface of the coating and additional structure and support to the crack resistant coating to resist rutting.

The method may further comprise the step of compacting the first aggregate mixture layer against the first binding material layer prior to the step of applying the second binding material layer, where the step of compacting the first aggregate mixture layer against the first binding material layer provides a substantially uniform thickness of the first aggregate mixture layer and the first binding material layer, reduces air void space in the first aggregate mixture layer, and promotes adhesion of the first aggregate mixture layer to the first binding material layer. The method may further comprise the step of compacting the second aggregate mixture layer against the second binding material layer to provide a substantially uniform thickness of the crack resistant coating, where the step of compacting the second aggregate mixture layer against the second binding material layer also reduces air void space in the second aggregate mixture layer, promotes adhesion of the second binding material layer to the first aggregate mixture layer, and promotes adhesion of the second aggregate mixture layer to the second binding material layer.

The first aggregate mixture layer and the second aggregate mixture layer may each comprise aggregate particles and an asphalt solution. The crack resistant coating may contain a total binding material, where the total binding material is a sum of the asphalt solution of the first aggregate mixture layer, the asphalt solution of the second aggregate mixture layer, the net binding material of the first binding material layer, and the binding material of the second binding material layer. The total binder material of the crack resistant coating may be greater than about 1.00 $L/m^2$-cm or 1.30 $L/m^2$-cm.

The step of applying the first binding material layer may further comprise applying the first binding material layer on the surface in an amount of from about 0.09 $L/m^2$-cm to about 0.533 $L/m^2$-cm, or more specifically of about 0.28 $L/m^2$-cm. The asphalt solution included in the first aggregate mixture layer may be present in an amount of from about 0.71 $L/m^2$-cm to about 1.95 $L/m^2$-cm, or more specifically about 1.16 $L/m^2$-cm. The step of applying the second binding material layer may further comprise applying the second binding material layer on the first aggregate mixture layer in an amount of from about 0.18 $L/m^2$-cm to about 1.07 $L/m^2$-cm, or more specifically about 0.57 $L/m^2$-cm. The asphalt solution included in the second aggregate mixture layer may be present in an amount of from about 0.18 $L/m^2$-cm to about 1.07 $L/m^2$-cm, or more specifically about 0.57 $L/m^2$-cm.

The crack resistant coating of the present invention may be disposed on a surface to provide resistance to high vertical and horizontal movements and high shear stresses. The coating may comprise a first binding material layer disposed on the surface to provide a substantially impermeable moisture barrier to the surface; a first aggregate mixture layer disposed on the first binding material layer, the first aggregate mixture layer providing support and structure to the coating to resist rutting; a second binding material layer disposed on the first aggregate mixture layer, the second binding material layer further providing another substantially impermeable moisture barrier to the surface; and a second aggregate mixture layer disposed on the second binding material layer, the second aggregate mixture layer providing a wear surface of the coating and additional structure and support to the crack resistant coating to resist rutting. The first and second aggregate mixtures may comprise a plurality of air voids and the first and second binding material may fill a percentage of the air voids, wherein the percentage of air voids filled with binding material is greater than about 15% or about 18%. The crack resistant coating may have a depth that is flooded with binding material, and the depth flooded with binding material may be greater than about 0.38 cm or 0.46 cm.

The crack resistant coating may be disposed on a surface, the coating comprising: a first layer comprising aggregate mixture and binding material, where the aggregate mixture comprises a plurality of air voids and where the binding material fills substantially all of the air voids such that the first layer resists cracking; and a second layer atop the first layer, the second layer comprising aggregate mixture and binding material, where the aggregate mixture comprises a plurality of air voids and a sufficient quantity of the air voids are not filled with binding material such that the second layer resists deformation and rutting. The first layer and the second layer are created simultaneously by first applying the binding material on the surface and then applying the aggregate mixture on the binding material. The first layer may have a depth greater than about 0.38 cm or greater than about 0.46 cm, greater than about 15% or 18% of the air voids in the first layer and the second layer combined may be filled with binding material.

DETAILED DESCRIPTION OF THE INVENTION

Figure 1:
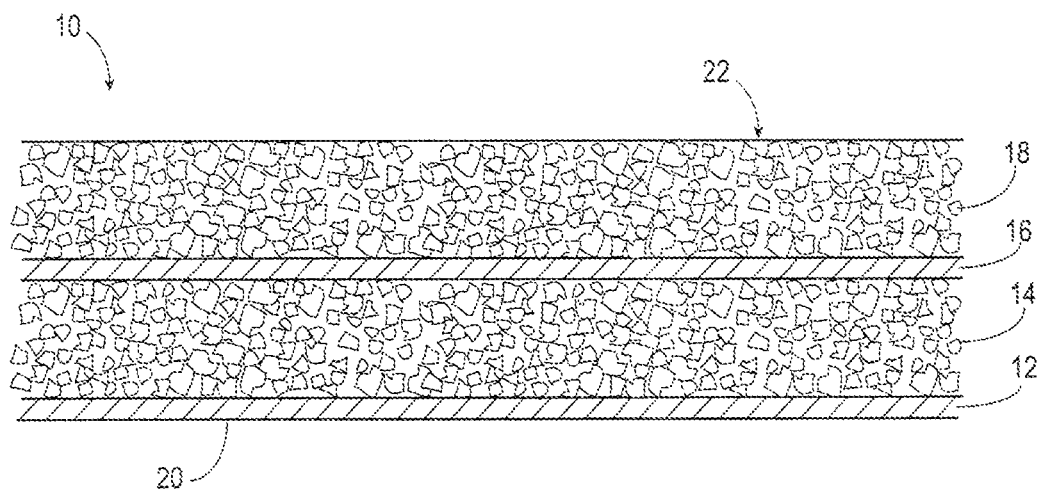
FIGS. 1(a)-1(b) show an embodiment of a crack resistant coating in accordance with the present invention.

The present invention relates to a crack resistant coating, such as pavement, disposed on a surface. Examples of surfaces include roads, streets, interstates, parking lots, airport runways, airport taxiways, and the like. The surfaces can be constructed of any material known in the art for the above mentioned types of surfaces, such as pavement, jointed Portland concrete cement, and the like. Generally, the surfaces have cracks. The crack resistant coating provides resistance to high vertical and horizontal movements and high shear stresses caused by deflection of the cracks in the surfaces and high shear stresses from traffic. More specifically, the crack resistant coating is provided with the ability to maintain stability while at the same time retard the propagation of cracking from the surface.

Broadly, the crack resistant coating includes a binding material and an aggregate mixture. The aggregate mixture contains aggregate and asphalt solution. The total binding material is the sum of net binding material and asphalt solution.

The binding material contains asphalt (or bitumen) and other additives suitable for use in asphalt binding materials, such as polymers, cross-linking agents, vulcanization agents, accelerators, extenders, fluxing agents, and the like. The additives used for fabricating the binding material are selected based on the desired properties of the binding material for a given application of the crack resistant coating.

The binding material can also he in the form of a polymer modified asphalt emulsion (PMAE), a hot asphalt cement, a hot polymer modified asphalt cement, a petroleum solvent cutback asphalt, and the like. The binding material is considered the residuum of the emulsified version as obtained by standard practice to those skilled in the art. When a liquid asphalt emulsion is used as the binding material, the asphalt emulsion can be formulated to have a low viscosity. The low viscosity of the asphalt emulsion thereby aids the asphalt emulsion's fluidity and it's ability to penetrate the aggregate mixture of the crack resistant coating. In addition, the asphalt emulsion or hot asphalt cement may be provided with an elastomeric type polymer to add flexibility to resist reflective cracking. Suitable polymers are described in U.S. Pat. No. 4,154,710, issued to Maldonado et al. on May 15, 1979, and or described in U.S. Pat. No. 4,145,322, issued to Maldonado et al. on May 20, 1979, the entirety of both of which are hereby incorporated herein by reference.

The crack resistant coating of the present invention includes large amounts of the total binding material per $m^2$ per cm ($yd^2$ per inch). The more total binding material that can be used in the crack resistant coating increases the crack resistant coating's ability to retard the propagation of cracks in the existing surface. Larger amounts of the total binding material also result in larger percentage of air voids in the crack resistant coating being filled, or conversely, a smaller percentage of air voids remaining in the crack resistant coating. Additionally, larger amounts of total binding material create a thicker substantially voidless layer.

The application of binding material is well known in the art. The traditional process uses a sprayer that applies the binding material before the paving process. When the binding material is an emulsion, the binding material is applied and allowed to cure for a substantial period of time. This is required to allow the binding material to become sufficiently hardened before construction traffic is allowed to drive on the surface. Even with this curing period, a significant amount of the binding material is removed from the surface by the construction traffic. Additionally, the hardened binding material may not be sufficiently fluid to fill the air voids of the aggregate mixture and create the height of substantially voidless layer.

In an effort to apply a sufficient amount of binding material with minimized losses due to construction traffic, extremely hard materials may be utilized for binding material. These binding materials are effective at reducing the amount of binding material removed by construction traffic. However, these extremely hard binding materials are also brittle and do not possess sufficient fluidity to fill air voids in an aggregate mixture and create the desired height of substantially voidless layer.

Binding material should have sufficient rheological properties to allow the material to migrate from the surface and fill air voids in the aggregate mixture to create the substantially voidless layer. Suitable binding materials are produced from bitumen or other hydrocarbons that do not exceed an original binder complex shear modulus of 1.0 kPa at a temperature of 82° C. (original binder $G^*/\sin \delta$) when tested according to the AASHTO Test Method T315-08 "Determining the Rheological Properties of Asphalt Binders Using Dynamic Shear Rheometer (DSR)". It is noted that one skilled in the art will recover the residuum from an emulsion and/or remove distillates from oil laden materials before performing rheological tests. Binding materials with an original binder complex shear modulus greater than about 1.0 kPa at 82° C. are not sufficiently fluid to migrate through the aggregate mixture to create the desired height of substantially voidless layer.

It is desirable for the binding material to possess adequate rheological properties and remain in place on the surface to fill the air voids of the aggregate mixture. To ensure sufficient fluidity and minimize hardening, the material may be applied within 15 seconds of the application of the aggregate mixture. Preferably, binding material may be applied within 10 seconds of the application of the aggregate mixture. Most preferably, the binding material may be applied within 5 seconds of the application of the aggregate mixture.

Alternately, binding material may emulsified. Emulsified binding material may maintain sufficient fluidity to migrate from the surface to fill air voids in the aggregate mixture creating the substantially voidless layer. These emulsified variants may possess binders with a complex shear modulus of >1.0 kPa at a temperature of 82° C. (original binder $G^*/\sin \delta$) if the aggregate mixture is applied while the binding material is still sufficiently emulsified. To ensure sufficient fluidity, the aggregate mixture with a binder >1.0 kPa is preferably applied within 15 seconds of the application of the emulsified binding material. More preferably, the aggregate mixture is applied within 10 seconds of the emulsified binding material with a hinder >1.0 kPa. Most preferably, the aggregate mixture is applied within 5 seconds of the emulsified binding material with a binder >1.0 kPa.

Additionally, it is desirable that the binding material does not receive any construction traffic from the time of application to the application of the aggregate mixture. This is desirable to ensure the binding material is not removed from the surface under normal construction traffic.

Voidless mixtures have significant resistance to high vertical and horizontal movements and high shear stresses caused by cracks or irregularities in the surface and high shear stresses caused by traffic and greatly resist cracking. Voidless mixtures tend to poorly resist deformation (i.e. rutting). Air voids are generally necessary to resist deformation. Current art desires at least 3% to 5% air voids or more to maintain adequate structure and prevent rutting. This minimum amount of air voids which is required to resist deformation enables cracking. The current practitioner must choose between cracking and rutting optimizing one or the other.

In the present invention, even though a large percentage of the aggregate mixture air voids are filled in the crack resistant coating, the uneven distribution of the air voids, substantially voidless at the bottom and sufficient air voids at the top, the crack resistant coating allows for both crack resistance and stability (i.e. resist rutting). It is this unforeseen and surprising discovery that enables the crack resistant mixtures ability to breach the preponderance of stability (rut resistance) and flexibility (the ability to withstand high vertical and horizontal movements and high shear stresses). The ability of the binding material to migrate into the air voids of the aggregate mixture is a critical part of the discovery. This phenomena allows the creation of a bi-layered system that has suitable air voids at the layer top to resist deformation (i.e. rutting) while simultaneously creating a substantially voidless layer of sufficient height at the layer bottom that resists high vertical and horizontal movements and high shear stresses. An interlayer that resists cracking also requires a surface layer that provides stability, and hence the value of the present invention is the ability to make a crack resistant layer that combines the benefits of an interlayer and a riding surface whereby the two layers are simultaneously created.

The effectiveness of any crack resistant layer is predicated on the existing surface and the type of service. Existing roads, pavements and the like with low horizontal and vertical movements tend to produce less cracking in the surface layers while high horizontal and vertical movements and high shear stresses tend to produce a larger number of cracks and more severe cracking. Additionally, dense aggregate mixtures with low air voids (<10%) are more likely to resist cracking than open graded aggregate mixtures with high air voids ($\geq$10%). The invention herein details a method and a crack resistant layer that has improved crack resistance in any situation with full understanding that the amount and severity of the eventual cracking is based on the level of horizontal and vertical movements, environmental factors, and service factors. The examples of crack resistant coatings described herein provide a crack resistant coating that can resist substantial cracking for greater than about two (2) years.

The total binding material is present in the crack resistant coating in an amount sufficient to enable the crack resistant coating to withstand movement and cycles of movement (i.e. flexing) without cracking. In one embodiment of the present invention, the total binding material is present in the crack resistant coating in an amount greater than about 1.00 liters per $m^2$ per centimeter (L/$m^2$-cm) [0.56 gallons per $yd^2$ per inch (gal/$yd^2$-in)]. In another embodiment of the present invention, the total binding material is present in the crack resistant coating in an amount greater than about 1.30 L/$m^2$-cm (0.73 gal/$yd^2$-in). In another embodiment of the present invention, the total binding material is present in the crack resistant coating in an amount greater than about 1.51 L/$m^2$-cm (0.85 gal/$yd^2$-in). The examples of crack resistant coatings described herein provide a crack resistant coating that can resist substantial cracking for greater than about two (2) years.

Additionally, the crack resistant coatings described herein provide a crack resistant coating having a high percentage air voids filled with the binding material. Air Voids Filled with Asphalt (AVFA) refers to the percent of air voids filled with binding material relative to the total air voids resident in the aggregate mixture, with the air voids calculated by the standard method per ASTM D 3203 'Standard Test Method for Percent in Compacted Dense and Open Bituminous Paving Mixtures'. The reduction in the amount of air voids present in crack resistant coating provides increased crack resistance to the crack resistant coating by providing additional asphalt at the bottom of the aggregate mixture layer resisting the creation and propagation of cracks. For example, the AVFA in the crack resistant coating is greater than about 15%. In another embodiment of the present invention, the AVFA in the crack resistant coating is greater than about 18%. The examples of crack resistant coatings described herein provide a crack resistant coating that can resist substantial cracking for greater than about two (2) years.

Additionally, the crack resistant coating described herein has a bottom portion of the layer that is substantially voidless. This substantially voidless portion is accomplished by a binding material of sufficient fluidity that fills in the aggregate mixture air voids from the bottom towards the top. A minimum thickness of substantially filled mixture is desired to achieve a crack resistant coating hereby defined as the height of the Substantially Voidless Layer. In one embodiment, the height of the Substantially Voidless Layer is at least 0.38 cm (0.15 inches) thick. In another embodiment the height of the Substantially Voidless Layer is at least 0.46 cm (0.18 inches) thick. The examples of crack resistant coatings described herein provide a crack resistant coating that can resist substantial cracking for greater than about two (2) years.

Not all of the binding material is available for filling in air voids of the aggregate mixture layer. The binding material will satisfy the demands of the old surface due to ageing, weathering, and aggregate adsorption. About 0.142 L/$m^2$ (0.031 gallon/$yd^2$) is required to satisfy the demands of the old surface and be adsorbed. Any binding material in excess of 0.142 L/$m^2$ (0.031 gallon/$yd^2$) is available to fill air voids of the aggregate mixture creating the desired AVFA and ensuring the desired height of the Substantially Voidless Layer, and can contribute to the total binding material. Alternately, binding material that is applied at less than 0.142 L/$m^2$ will not contribute to AVFA or the height of Substantially Voidless Layer.

It should be understood and appreciated that any type of pretreatment of bituminous or other material to the surface, within three months prior to application of the Crack Resistant layer will satisfy the demands of the old surface. The volume of net binding material then becomes equal to the total binding material applied. The Binding Material Adsorbed is considered to be previously satisfied by the pretreatment and becomes 0.00 L/$m^2$.

To calculate the AVFA and the height of the Substantially Voidless Layer, the following example is provided:
Emulsified Binding Material application rate 0.836 L/$m^2$
 residuum is used if emulsions or cutbacks are utilized
Binding Material Residuum 62.0%
Binding Material adsorbed 0.142 L/$m^2$
Crack Resistant Layer Thickness 4.45 cm
 measured from field production Aggregate Mixture Air Voids 5.0%
based on lab tests of the aggregate mixture per ASTM 3203 standard test method based on compacted aggregate mixture without binding material Volume of net Binding Material – Equation #1 =
$$((0.836 \text{ L/m}^2 \times .620) - 0.142 \text{ L/m}^2)(1000 \text{ cm}^3/\text{L}) = 376 \text{ cm}^3$$

Volume of Total Air Voids – Equation #2 =
$$(5.0\%)(4.45 \text{ cm})(1 \text{ m}^2)(100^2 \text{ cm}^2/\text{m}^2) = 2,225 \text{ cm}^3$$

$$AVFA = (376 \text{ cm}^3)/(2,225 \text{ cm}^3) = 16.9\%$$

Height of the Substantially Voidless Layer – Equation #3 =
$$(4.45 \text{ cm})(16.9\%) = 0.752 \text{ cm}$$

The aggregate mixture of the crack resistant coating provides support and structure to the crack resistant coating to resist rutting. The aggregate mixture contains aggregate particles. The aggregate particles can be sized and shaped so as to provide sufficient structure and support thereby resisting the formation of ruts in the crack resistant coating. Examples of aggregate particles include stone chips, gravel, recycled asphalt pavement (RAP), and combinations thereof. Although some examples of aggregate particles are described herein, it should be understood and appreciated that the aggregate particles used in accordance with the present invention can be any suitable material known in the art for use as aggregate particles in asphalt paving applications. The aggregate mixture is added to the crack resistant coating in any amount sufficient to provide support and structure to the crack resistant coating to resist rutting and maintain stability of the crack resistant coating.

The crack resistant coating is applied on a surface to increase resistance to high vertical and horizontal movements and high shear stresses. The crack resistant coating is disposed on a surface in an amount sufficient to allow the crack resistant coating to withstand movement and cycles of movement (i.e. flexing) without cracking and in an amount to resist rutting. It should be understood and appreciated that the crack resistant coating can be applied to the surface in an amount sufficient to produce a desired thickness. In one embodiment of the present invention, the crack resistant coating is applied to a surface to produce a thickness in a range of greater than about 0.635 cm (0:25 inch). In another embodiment, the thickness of the crack resistant coating is greater than about 1.27 cm (0.50 in.) thick. In another embodiment; the thickness of the crack resistant coating is greater than about 3.81 cm (1.5 in.) thick.

Figure 1A:
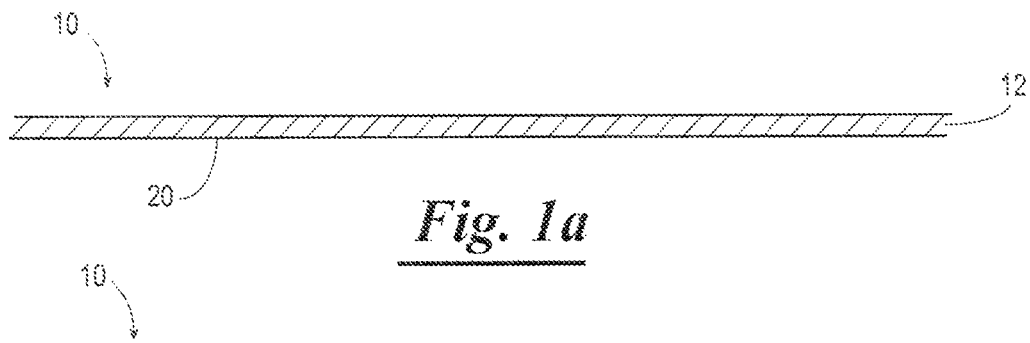
Figure 1B:
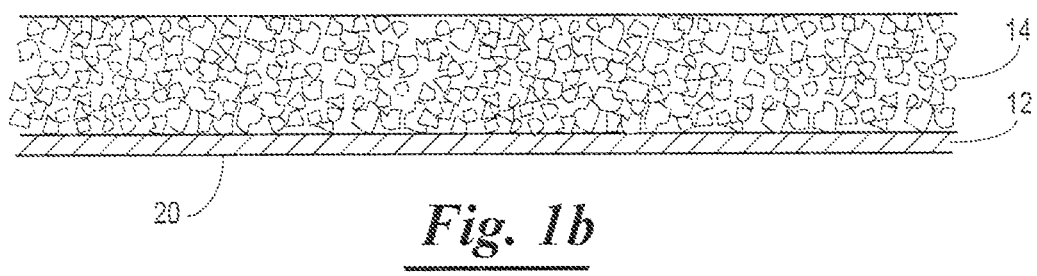
Figure 2A:
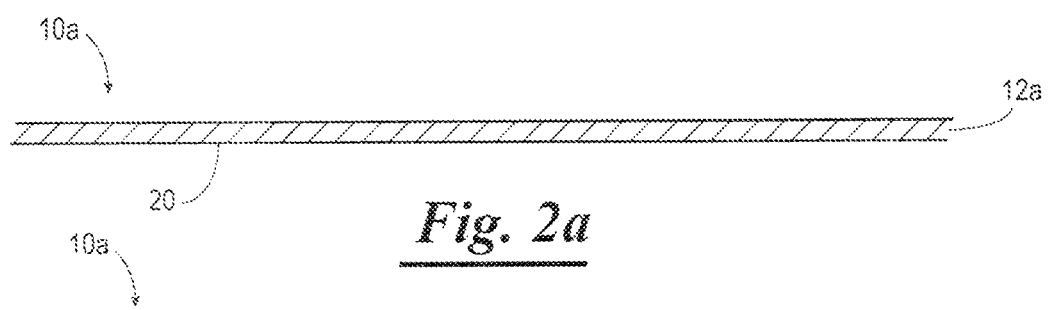
FIGS. 2(a)-2(d) show another embodiment of a crack resistant coating in accordance with the present invention.
Figure 2B:
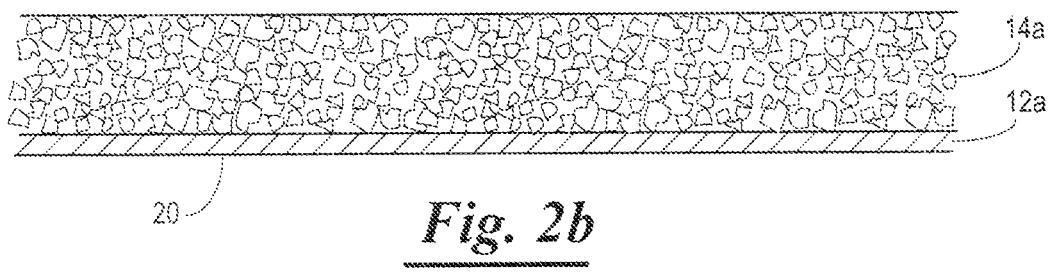
Figure 2C:
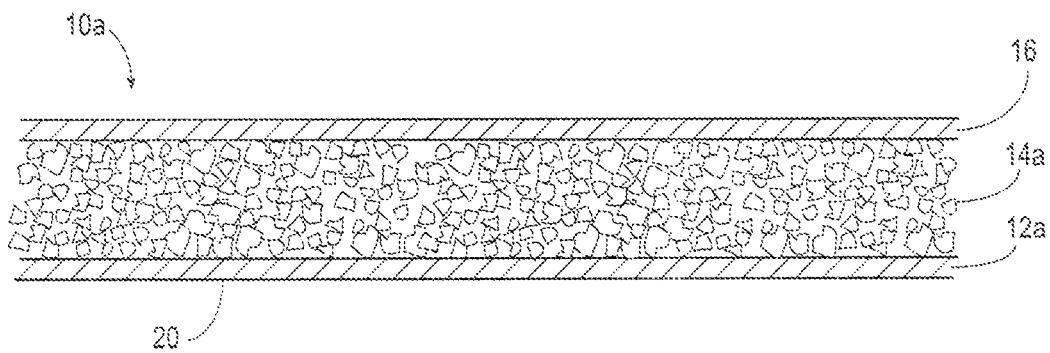
Figure 2D:
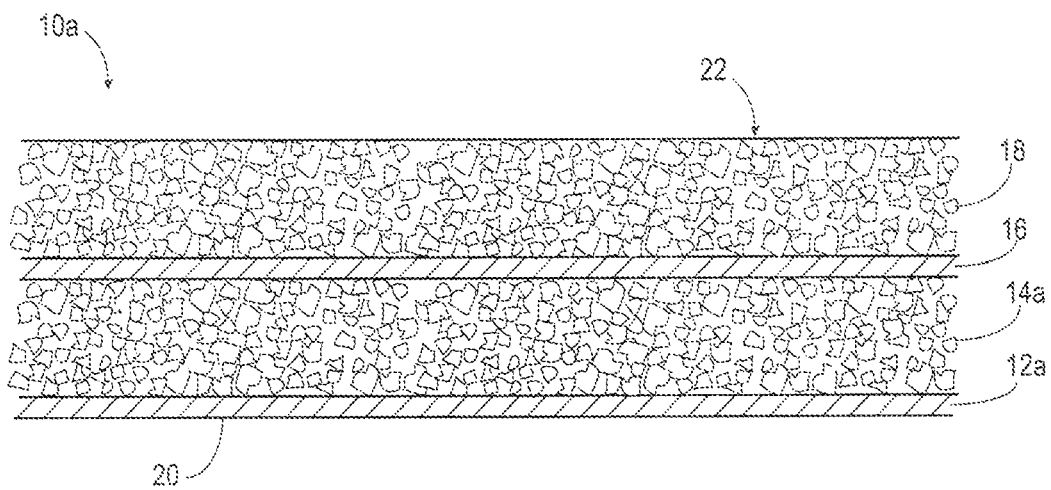

Referring now to the drawings, and more particularly to FIGS. 1(a)-1(b), shown therein is a crack resistant coating 10 constructed in accordance with the present invention. The crack resistant coating 10 includes a first binding material layer 12 and a first aggregate mixture layer 14. The first binding material layer 12 is disposed on a surface 20 and the first aggregate mixture layer 14 is disposed on the first binding material layer 12.

The first binding material layer 12 bonds to the surface 20 and provides the surface 20 with a substantially impermeable moisture barrier to prevent moisture (i.e. water) from entering the cracks present in the surface 20 and satisfies the demands of the surface 20 due to ageing, weathering, and aggregate adsorption. The first binding material layer 12 also delays raveling and further deterioration of the cracks present in the surface 20.

The first aggregate mixture layer 14 provides support and structure to the crack resistant coating 10 to resist rutting. Additionally, the first aggregate mixture layer 14 provides a wear surface 22 maintaining adequate texture for traffic safety and resistance to rutting.

The aggregate mixture of the first aggregate mixture layer 14 can contain aggregate particles, an asphalt solution, or a combination thereof. The aggregate particles can be sized and shaped so as to provide sufficient structure and support thereby resisting the formation of ruts in the crack resistant coating 10. Examples of aggregate particles include stone chips, gravel, Recycled Asphalt Pavement (RAP), other recycled materials, and combinations thereof. Although some examples of aggregate particles are described herein, it should be understood and appreciated that the aggregate particles used in accordance with the present invention can be any suitable material known in the art for use as aggregate particles in asphalt paving applications.

The asphalt solution can be any type of bituminous material known in the art. Examples of bituminous materials include petroleum based asphalt, asphalt cement (AC), pitch, coal tar, asphalt, vacuum tar bottoms (VTB), resid, performance grade (PG) asphalts, flux, petroleum products, and combinations thereof as well as polymer modified versions thereof. Suitable polymers are described in U.S. Pat. No. 4,154,710, issued to Maldonado et al. on May 15, 1979, and or described in U.S. Pat. No. 4,145,322, issued to Maldonado et al. on May 20, 1979.

The asphalt solution contained in the aggregate mixture may coat a portion of the aggregate particles or coat substantially all of the aggregate particles to create a hot-mix asphalt (HMA). The aggregate mixture is considered a HMA when the temperature of the aggregate mixture is greater than about 125° C. (257° F.). In an alternative embodiment of the present invention, the aggregate mixture is provided in the form of a "warm" mix. The aggregate mixture is considered a "want" mix when the temperature of the aggregate mixture is in a range of from an ambient temperature to about 125° C. (257° F.). In another embodiment of the present invention, the aggregate mixture is provided in the form of a "cold" mix. The aggregate mixture is considered a "cold" mix when the temperature of the aggregate mixture is about ambient temperature. It should be understood and appreciated that the ambient temperature can be the ambient air temperature anywhere the aggregate mixture is produced and/or used. It should also be understood and appreciated that the asphalt solution contained in the aggregate mixture can be the same as any embodiment of the binding material in the first binding material layer 12 described herein. It should further be understood and appreciated that the asphalt solution contained in the aggregate mixture and the binding material in the first binding material layer 12 are combined to represent a total binder material of the crack resistant coating 10.

The asphalt solution can be present in the aggregate mixture in an amount sufficient to bind the aggregate particles together yet not destroy the structure and support provided by the first aggregate mixture layer 14. In one embodiment, the asphalt, solution is present in the aggregate mixture in an amount less than about 15 wt %. In another embodiment, the asphalt solution is present in the aggregate mixture in an amount in a range of from about 2 wt % to about 12 wt %.

In use, the crack resistant coating 10 is applied on a surface 20 to increase resistance to high vertical and horizontal movements and high shear stresses. The first binding material layer 12 of the crack resistant coating 10 is disposed on the a surface 20 in an amount sufficient to allow the crack resistant coating 10 to withstand movement and cycles of movement (i.e. flexing) without cracking. The first binding material layer 12 is provided in an amount sufficient to penetrate the first aggregate mixture layer 14 and substantially fill greater than about 15% of available air voids within the aggregate material of the first aggregate mixture layer 14 (Air Voids Filled with Asphalt—AVFA). Alternatively, the first binding material layer 12 can be provided in an amount sufficient to penetrate the first aggregate mixture layer 14 and substantially fill greater than about 18% AVFA of the first aggregate mixture layer 14. In one embodiment, the first binding material layer 12 is disposed on the surface 20 in an amount in a range of greater than about 0.15 L/m² (0.033 gal/yd²). In another embodiment, the first binding material layer 12 is disposed on the surface in the amount of greater than about 0.50 L/m² (0.11 gal/yd²). In another embodiment, the first binding material layer 12 is disposed on the surface in the amount of greater than about 0.72 L/m² (0.16 gal/yd²).

The aggregate mixture of the first aggregate mixture layer 14 can then be added in an amount sufficient to provide a substantially uniform thickness of the first aggregate mixture layer 14 in an amount of at least about 0.635 cm (0.25 in). In an alternative embodiment, the aggregate mixture of the first aggregate mixture layer 14 can be added in an amount sufficient to provide a substantially uniform thickness of the first aggregate mixture layer 14 in an amount of at least about 1.27 cm (0.50 in). In an alternative embodiment, the aggregate mixture of the first aggregate mixture layer 14 can be added in an amount sufficient to provide a substantially uniform thickness of the first aggregate mixture layer 14 in a range of greater than about 3.81 cm (1.50 in).

The binding material described herein fills the air voids within the aggregate mixture of the first aggregate mixture layer 14 to the extent that the crack resistant coating 10 resists rutting and is resistant to substantial propagation of the cracks in the surface 20 for at least about two years.

The amount of air voids in the crack resistant coating 10 that are filled with binding material 12 is determined by Equation #1 and Equation #2. The height of the Substantially Voidless Layer is calculated by Equation #3. In one embodiment of the present invention, the crack resistant coating 10 that is flooded with binding material creating the height of the Substantially Voidless Layer is in a range of greater than about 0.38 cm (0.15 inches). In another embodiment of the present invention, the crack resistant coating 10 that is flooded with binding material creating the Height of the Substantially Voidless Layer is in a range of greater than about 0.46 cm (0.18 inches).

The crack resistant coatings 10 described above also provide large amounts of total binding material (binding material in the first binding material layer 12 and asphalt solution contained in the aggregate mixture combined) per square meter per centimeter (per square yard per inch). In one embodiment described herein, the total binding material (or binding material and asphalt solutions combined) is present in the crack resistant coating 10 in an amount of at least about 1.00 L/m²-cm (0.56 gal/yd²-in). In another embodiment described herein, the total binding material (or binding material and asphalt solutions combined) is present in the crack resistant coating 10 in an amount of at least about 1.30 L/m²-cm (0.730 gal/yd²-in). In another embodiment of the present invention, the total binding material is present in the crack resistant coating in an amount greater than about 1.51 L/m²-cm (0.85 gal/yd²-in).

After the first aggregate mixture layer 14 is applied to the first binding material layer 12, the first aggregate mixture layer 14 may be compacted against the first binding material layer 12. Compacting the first aggregate mixture layer 14 against the first binding material layer 12 provides a substantially uniform thickness of the first aggregate mixture layer 14 and the first binding material layer 12. In addition, compacting the first aggregate mixture layer 14 and the first binding material layer 12 reduces air void space in the first aggregate mixture layer 14 by forcing the binding material of the first binding material layer 12 into the air voids existing in the first aggregate mixture layer 14. Additionally, compacting the first aggregate mixture layer 14 against the first binding material layer 12 promotes the adhesion of the first aggregate mixture layer 14 to the first binding material layer 12. Finally, compacting the first aggregate mixture layer 14 provides a smoother wearing surface 22, which is quieter and safer for public travelers.

Referring now to FIGS. 2(a)-2(d), shown therein is a crack resistant coating 10a constructed in accordance with the present invention. The crack resistant coating 10a includes a first binding material layer 12a, a first aggregate mixture layer 14a, a second binding material layer 16 and a second aggregate mixture layer 18. The first binding material layer 12a is disposed on the surface 20 and the first aggregate mixture layer 14a is disposed on the first binding material layer 12a. Further, the second binding material layer 16 is disposed on the first aggregate mixture layer 14a and the second aggregate mixture layer 18 is disposed on the second binding material layer 16.

The first binding material layer 12a and the second binding material layer 16 may be constructed from similar materials and function in a similar manner as described herein. However, it should also he understood that the first binding material layer 12a may be constructed from different materials and perform a different function than the second binding material layer 16. Additionally, the first aggregate mixture layer 14a. and the second aggregate mixture layer 18 may be constructed from similar materials and function in a similar manner as described herein. However, it should be understood that the first aggregate mixture layer 14a may be constructed from different materials and perform a different function than the second aggregate mixture layer 18.

The first binding material layer 12a bonds to the surface 20 and provides the surface 20 with a substantially impermeable moisture barrier to prevent moisture (i.e. water) from entering the cracks present in the surface 20. The second binding material layer 16 also provides the crack resistant coating 10a with an additional substantially impermeable moisture barrier to further prevent the migration of moisture from entering the cracks present in the surface 20. The first binding material layer 12a and the second binding material layer 16 also delay raveling and further deterioration of the cracks present in the surface 20.

The first aggregate mixture layer 14a provides support and structure to the crack resistant coating 10a to resist rutting. Additionally, the first aggregate mixture layer 14a can provide an interim wearing surface for traffic prior to adding the second binder material layer 16 and the second aggregate mixture layer 18. The second aggregate mixture layer 18 provides further support and structure to the crack resistant coating 10a and provides a wear surface 22 maintaining adequate texture for traffic safety and resistance to rutting.

The aggregate mixture of the first aggregate mixture layer 14a and the second aggregate mixture layer 18 contains aggregate particles, an asphalt solution, or a combination thereof. The aggregate particles can be sized and shaped so as to provide sufficient structure and support thereby resisting the formation of ruts in the crack resistant coating 10a. It should be understood and appreciated that the asphalt solution contained in the aggregate mixtures and the binding material in the first binding material layer 12a and the second binding material layer 16 are combined to represent a total binder material of the crack resistant coating 10a. Additionally, it should be understood and appreciated that the combination of aggregate and asphalt solution comprising the first aggregate mixture 14a and combination of aggregate and asphalt solution comprising the second aggregate mixture 18 need not be of similar composition or of equivalent thickness.

The asphalt solution can be present in the aggregate mixtures in an amount sufficient to bind the aggregate particles together yet not destroy the structure and support provided by the first aggregate mixture layer 14a and the second aggregate mixture layer 13. In one embodiment, the asphalt solution is present in the aggregate mixtures in an amount less than about 15 wt %. In another embodiment, the asphalt solution is present in the aggregate mixtures in an amount in a range of from about 2 wt % to about 12 wt %.

In use, the crack resistant coating 10a is applied on the surface 20 to increase resistance to high vertical and horizontal movements and high shear stresses. The first binding material layer 12a of the crack resistant coating 10a is disposed on the surface 20 in an amount sufficient to allow the crack resistant coating 10a to withstand movement and cycles of movement (i.e. flexing) without cracking and in an amount to resist rutting. The first binding material layer 12a is provided in an amount sufficient to penetrate the first aggregate mixture layer 14a and fill from about 0.50% to about 99% of available air voids within the aggregate material of the, first aggregate mixture layer 14a. Alternatively, the first binding material layer 12a can be provided in an amount sufficient to penetrate the first aggregate mixture layer 14a and fill from about 15% to about 67% of available air voids within the aggregate material of the first aggregate mixture layer 14a. In one embodiment, the first binding material layer 12a is disposed on the surface 20 in an amount in a range of greater than about 0.15 L/m$^2$ (0.033 gal/yd$^2$). In another embodiment, the first binding material layer 12a is disposed on the surface in the amount greater than about 0.28 L/m$^2$ (0.16 gal/yd$^2$).

The aggregate mixture of the first aggregate mixture layer 14a can then be added in an amount sufficient to provide a substantially uniform thickness of the first aggregate mixture layer 14a in a range of greater than about 6.35 mm (0-0.25 in). In an alternative embodiment, the aggregate mixture of the first aggregate mixture layer 14a can be added in an amount sufficient to provide a substantially uniform thickness of the first aggregate mixture layer 14a in a range of greater than about 3.81 cm (1.5 in).

Similar to the first binding material layer 12a, the second binding material layer 16 is disposed on the first aggregate mixture layer 14a in an amount sufficient to allow the crack resistant coating 10a to withstand movement and cycles of movement (i.e. flexing) without cracking. Furthermore, the second binding material layer 16 should also be provided in an amount sufficient to penetrate a portion or all of the remaining air voids present in the first aggregate mixture layer 14a and fill less than about 75% of available air voids within the aggregate material of the second aggregate mixture layer 18.

The aggregate mixture of the second aggregate mixture layer 18 is then added in an amount sufficient to provide a substantially uniform thickness of the second aggregate mixture layer in a range of greater than about 0.635 cm (0.25 inch). In an alternative embodiment, the aggregate mixture of the second aggregate mixture layer 18 can be added in an amount sufficient to provide a substantially uniform thickness of the second aggregate mixture layer 14a in a range of greater than about 3:81 cm (1.5 in).

The binding material described herein fills the air voids within the aggregate mixtures of the first aggregate mixture layer 14a and the second aggregate mixture layer 18 to the extent that the crack resistant coating 10a resists rutting and can resist substantial cracking in the surface 20 for greater than about two (2) years. In one embodiment of the present invention, the air voids present in the first aggregate mixture layer 14a and the second aggregate mixture layer 18 are filled with binding material in a percentage greater than about 15%. In another embodiment of the present invention, the percentage of air voids filled in the first aggregate mixture layer 14a and the second aggregate mixture layer 18 is greater than about 18%.

The amount of air voids in the crack resistant coating 10a that are filled with binding material is determined by measuring the percentage of the height (or depth) of the crack resistant coating 10a that is flooded with binding material. In one embodiment the height of the Substantially Voidless Layer is at least 0.38 cm (0.15 inches) thick. In another embodiment the height of the Substantially Voidless Layer is at least 0.46 cm (0.18 inches) thick. The examples of crack resistant coatings described herein provide a crack resistant coating that can resist substantial cracking for greater than about two (2) years.

The crack resistant coating 10a described herein also provides large amounts of total binding material (binding material in the first and second binding material layers 12a and 16 and asphalt solution contained in the first and second aggregate mixture layers 14a and 18 combined) per meter per centimeter (per square yard per inch). In one embodiment described herein, the total binding material (or binding material and asphalt solutions combined) is present in the crack resistant coating 10a in an amount of at least about 1.00 L/m$^2$-cm (0.56 gal/yd$^2$-in). In another embodiment described herein, the total binding material (or binding material and asphalt solutions combined) is present in the crack resistant coating 10a in an amount of at least about 1.30 L/m$^2$-cm (0.73 gal/yd$^2$-in). In another embodiment of the present invention, the total binding material is present in the crack resistant coating in an amount greater than about 1.51 L/m$^2$-cm (0.85 gal/yd$^2$-in).

After the first aggregate mixture 14a is applied to the first binding material 12a, the first aggregate mixture layer 14a may be compacted against the first binding material layer 12a prior to the step of applying the second binding material layer 16. Compacting the first aggregate mixture layer 14a against the first binding material layer 12a provides a substantially uniform thickness of the first aggregate mixture layer 14a and the first binding material layer 12a. The substantially uniform thickness of the first aggregate mixture layer 14a and the first binding material layer 12a allows for a more efficient application of the second binding material layer 16 and the second aggregate mixture layer 18. Furthermore, compacting the first aggregate mixture layer 14a against the first binding material layer 12a reduces void space in the first aggregate mixture layer 14a by forcing the binding material of the first binding material layer 12a into the air voids in the first aggregate mixture layer 14a. Additionally, compacting the first aggregate mixture layer 14a against the first binding material layer 12a promotes the adhesion of the first aggregate mixture layer 14a to the first binding material layer 12a. Finally, compacting the first aggregate mixture layer 14a provides an interim wear surface for traffic prior to applying the second binding material layer 16 and the second aggregate mixture layer 18. The interim wear surface is sufficient to maintain adequate texture for traffic safety and resistance to rutting.

After the second aggregate mixture 18 is applied to the second binding material layer 16, the method for applying the crack resistant coating 10a to the existing surface further includes compacting the second aggregate mixture layer 18 against the second binding material layer 16 after the step of applying the second aggregate mixture layer 18. Compacting the second aggregate mixture layer 18 against the second binding material layer 16 provides a substantially uniform thickness of the crack resistant coating 10a. The substantially uniform thickness of the crack resistant coating 10a provides a safer and quieter driving surface for traffic. Furthermore, compacting the second aggregate mixture layer 18 against the second binding material layer 16 further reduces void spaces contained in the first aggregate mixture layer 14a by forcing the binding material of the second binding material layer 16 into a portion or substantially all of the air voids remaining in the first aggregate material layer 14a. Additionally, compacting the second aggregate mixture layer 18 against the second binding material layer 16 promotes the adhesion of the second aggregate mixture layer 18 to the second binding material layer 16. Finally, compacting the second aggregate mixture layer 18 provides a smoother wearing surface 22, which is quieter and safer for public travelers.

EXAMPLE 1

A test trial was executed in Missouri on Route T about 5.6 Km West of Route 100. A dense graded (<10% air voids) aggregate mixture was produced using aggregate particles and asphalt solution. The aggregate mixture utilized 4.8% asphalt solution by weight and exhibited 5.0% air voids. All Crack Resistant Layers were applied at about 4.44 cm thick. Prior to experimentation, the road was surveyed for cracks and it exhibited an uneven crack pattern. Table #1 shows the data from the test site.

TABLE #1

Field Experiment
St Albens Road, Route T Missouri - 5.6 Km West of Rte 100
5% air voids, 4.8% binder content, 4.44 cm thick thick

| Emulsified Binding Layer (L/m$^2$) | Emulsion Residue | Bonding Layer L/m$^2$ | Existing Cracks per 1000 m (m) |
|---|---|---|---|
| 0.361 | 32% | 0.116 | 935 |
| 0.678 | 62% | 0.420 | 1235 |
| 0.840 | 62% | 0.521 | 937 |

Table #2 shows the calculated results from the trials and crack count data after 9 months of service. The data shows the control section with 0% AVFA, 0.00 cm in height of Substantially Voidless layer and a Total Binding Material of 1.11 L/(m$^2$-cm) has little resistance to cracking exhibiting 18 times the cracking as compared to the embodiment with 13% AVFA. Almost 3% of the existing cracks have returned in less than one year.

TABLE #2

Calculations and Results
St Albens Road, Route T Missouri - 5.6 Km West of Rte 100

| AVFA | Voidless Filled Height (cm) | Total Binding Material (L/(m$^2$-cm)) | Reflected Cracks per 1000 m (m) | Reflective Cracking |
|---|---|---|---|---|
| 0.0% | 0.00 | 1.11 | 24.8 | 2.66% |
| 13.0% | 0.58 | 1.17 | 1.8 | 0.14% |
| 17.6% | 0.78 | 1.20 | 0.0 | 0.00% |

Alternately, the second test section started with about 32% more cracks relative to the control section. The data shows the first experimental section has 13.0% AVFA, 0.58 cm in height of Substantially Voidless layer and a Total Binding Material of 1.17 L/(m$^2$-cm) and is essentially crack free within 9 months. The third experimental section has 17.6% AVFA along with 0.78 cm in height of Substantially Voidless layer and remains crack free. The two example that possess >15% AVFA and or >0.38 cm in height of substantially voidless layer are remaining substantially crack resistant and significantly better than the control.

EXAMPLE #2

A second field trail was conducted on private property with an open graded aggregate mixture. In normal application, an aggregate mixture with >10% air voids is considered open graded and has little to no resistance to cracking. The first section was produced with one binding material layer and one aggregate mixture layer. The second experimental section was produced utilizing a binding material and aggregate mixture followed by a successive application of another binding material and aggregate mixture. All binding materials were the same as well as all aggregate mixtures were identical.

TABLE #3

Field Data - 18 months old
Tulsa Field Trial
10.0% air voids, 5.25% binder content

| Emulsified Binding Layer (L/m$^2$) | Emulsion Residue | Bonding Layer L/m$^2$ | Mixture Depth (cm) |
|---|---|---|---|
| 1.084 | 62% | 0.672 | 2.22 |
| 2.530 | 62% | 1.569 | 3.49 |

Table #3 details the application data. Both experimental sections utilized high rates of binding material.

TABLE #4

Calculations and Results
Tulsa Field Trial

| AVFA | Voidless Filled Height (cm) | Total Binding Material (L/(m$^2$-cm)) | Reflective Cracking |
|---|---|---|---|
| 24.8% | 0.55 | 1.41 | 13.3% |
| 42.5% | 1.48 | 1.55 | 1.0% |

Table #4 details the experimental results. Open graded mixes have virtually no resistance to high horizontal and vertical movements. Reflective cracking in these types of mixes are generally immediate and substantial. The first experimental section exhibits only 13% reflective cracking after 18 months while the second section is essentially crack free. These embodiments that have >18% AVFA and >0.46 cm in height of substantially voidless layer exhibit substantial crack resistance.

It should be understood and appreciated that any embodiment of the crack resistant coating described herein can be implemented in the method for applying the crack resistant coating to the surface described above. It should also be understood and appreciated that any embodiment of the crack resistant coating described herein can be mixed, transported, applied, and compacted using standard surface coating equipment know to one of ordinary skill in the art, such as that described in U.S. Pat. No. 5,069,578 and French Patent No. 2,550,248, both of which are hereby incorporated by reference.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A crack resistant coating disposed on a surface to provide resistance to high vertical and horizontal movements and high shear stresses, the coating comprising:
    a first binding material layer disposed on the surface to provide a substantially impermeable moisture barrier to the surface;
    a first aggregate mixture layer disposed on the first binding material layer, where the first aggregate mixture layer comprises aggregate and asphalt and where the first aggregate mixture layer is disposed on the first binding material layer within fifteen seconds of the first binding material layer being disposed on the surface, the first aggregate mixture layer providing support and structure to the coating to resist rutting;
    a second binding material layer disposed on the first aggregate mixture layer, the second binding material layer further providing another substantially impermeable moisture barrier to the surface; and
    a second aggregate mixture layer disposed on the second binding material layer, where the second aggregate mixture layer comprises aggregate and asphalt and where the second aggregate mixture layer is disposed on the second binding material layer within fifteen seconds of the second binding material layer being disposed on the first aggregate mixture layer, the second aggregate mixture layer providing a wear surface of the coating and additional structure and support to the crack resistant coating to resist rutting,
    where the first binding material layer comprises binding material and the second binding material layer comprises the same binding material as the first binding material layer or different binding material than the first binding material layer.

2. The coating of claim 1 wherein the first and second aggregate mixtures comprise a plurality of air voids and where the first and second binding material fills a percentage of the air voids, and wherein the percentage of air voids filled with the first and second binding material is greater than about 15%.

3. The coating of claim 2 wherein the percentage of air voids filled with the first and second binding material is greater than about 18%.

4. The coating of claim 1 wherein the crack resistant coating has a depth that is flooded with the first and second binding material, and wherein the depth flooded with the first and second binding material is greater than about 0.38 cm.

5. The coating of claim 4 wherein the crack resistant coating has a depth that is flooded with the first and second binding binding material, and wherein the depth flooded with the first and second binding material is greater than about 0.46 cm.

6. A crack resistant coating disposed on a surface, the coating comprising:
    a first layer comprising a first aggregate mixture and a first binding material, where the first aggregate mixture comprises aggregate, asphalt, and a plurality of air voids and where the first binding material fills substantially all of the air voids such that the first layer resists cracking; and
    a second layer atop the first layer, the second layer comprising a second aggregate mixture and a second binding material, where the second aggregate mixture comprises aggregate, asphalt, and a plurality of air voids and a sufficient quantity of the air voids are not filled with binding material such that the second layer resists deformation and rutting;
    where the first layer is created by first applying the first binding material on the surface and then applying the first aggregate mixture on the first binding material within fifteen seconds and the second layer is created by first applying the second binding material on the first layer and then applying the second aggregate mixture on the second binding material within fifteen seconds and where the first binding material is the same binding material as the second binding material or is different binding material than the second binding material.

7. The crack resistant coating of claim 6 where the aggregate mixture is applied within 10 seconds of applying the binding material to the surface.

8. The crack resistant coating of claim 6 where the aggregate mixture is applied within 5 seconds of applying the binding material to the surface.

9. The crack resistant coating of claim 6 where the first layer has a thickness greater than about 0.38 cm.

10. The crack resistant coating of claim 6 where the first layer has a thickness greater than about 0.46 cm.

11. The crack resistant coating of claim 6 where the coating has total air voids comprising the air voids in the first layer and the air voids in the second layer, combined, and where greater than about 15% of the total air voids are filled with binding material.

12. The crack resistant coating of claim 6 where the coating has total air voids comprising the air voids in the first layer and the air voids in the second layer, combined, and where greater than about 18% of the total air voids are filled with binding material.

* * * * *